United States Patent
Ohms et al.

(10) Patent No.: US 7,191,661 B2
(45) Date of Patent: Mar. 20, 2007

(54) CAPACITIVE PRESSURE SENSOR

(75) Inventors: Torsten Ohms, Gerlingen (DE); Oliver Stoll, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 11/107,510

(22) Filed: Apr. 15, 2005

(65) Prior Publication Data

US 2005/0229711 A1    Oct. 20, 2005

(30) Foreign Application Priority Data

Apr. 16, 2004    (DE)    .................... 10 2004 018 408

(51) Int. Cl.
*G01L 9/12*    (2006.01)
(52) U.S. Cl. ........................................... 73/718
(58) Field of Classification Search .................. 73/718, 73/724, 706, 756
See application file for complete search history.

(56) References Cited

U.S. PATENT DOCUMENTS

| | | | |
|---|---|---|---|
| 6,341,527 B1 * | 1/2002 | Ishikura et al. | ................ 73/718 |
| 6,382,030 B1 * | 5/2002 | Kihara et al. | ................. 73/718 |
| 6,968,744 B1 * | 11/2005 | Silverbrook et al. | .......... 73/724 |

* cited by examiner

Primary Examiner—Jewel Thompson
(74) Attorney, Agent, or Firm—Kenyon & Kenyon LLP

(57) ABSTRACT

A capacitive pressure sensor made up of two silicon on insulator (SOI) wafers lying opposite of each other and joined to each other in a vacuum-tight manner, a recess being formed between the two wafers. The first wafer exclusively supports the evaluation circuits required for measuring the applied pressure and a capacitive electrode, and the second wafer has a recess formed by surface micromechanics processes, in which the counter electrode to the capacitive electrode of the first wafer is situated. The second wafer at the same time forms a cover for the first wafer.

6 Claims, 4 Drawing Sheets

CAPACITIVE PRESSURE SENSOR

BACKGROUND INFORMATION

Pressure sensors for measuring pressure changes are generally known. Currently used micromechanical pressure sensors operate, for example, according to the piezoresistive method. Thus micromechanical sensors exist particularly as silicon pressure sensors, which are essentially made up of a diaphragm clamped on all sides, which arches in the event of a pressure difference between the two diaphragm surfaces. The signal conversion is performed, for example, using integrated monocrystalline or dielectrically insulated polycrystalline piezoresistors or by capacitance measurements with respect to a fixed counter-electrode (piezoresistive or capacitive signal conversion). Disadvantageous in these sensors is the fact that a high current is required for measuring the resistance, which results in an unnecessarily high power consumption, and that the piezoresistive effect is highly temperature-dependent, which causes problems especially in high-temperature applications.

Capacitive pressure sensors are therefore developed, in which pressure changes are detected via a capacitive evaluation of a diaphragm deflection. Thus, for example, C. Y. Lee et al., "Quartz Capsule Pressure Transducer for the Automotive Industry", Society of Automotive Engineers, Inc. 1980, discloses a pressure sensor of this kind, in which a first quartz glass or sapphire substrate having a stationary electrode and a second quartz glass or sapphire substrate having a movable electrode are situated in such a way that the surfaces of the electrodes lie across from each other and that peripheral sections of the substrates are joined or bonded with each other by a glass having a low melting point such that a predetermined gap results in between.

German Patent No. DE 42 44 450 describes a method for manufacturing a capacitive pressure sensor that starts out from two substrates from the same electrically insulated material having surface sections that are situated in such a way that they lie across from each other and that are subjected to a joining process. In one of the substrates a recess is formed which is fitted with an electrode made of a conductive thin-layer. A second electrode, likewise made of a conductive thin-layer, is formed on a section of that surface of the second substrate that is to be joined with the first substrate. The two substrates are subsequently directly joined in such a way that the surfaces configured with the electrodes are laid opposite each other and are permanently joined to each other through the application of a heat treatment and that subsequently at least one of the substrates is reduced to an appropriate thickness. German Patent No. DE 35 20 064 describes a method for manufacturing a capacitive pressure sensor based on the principle that a layer made of insulating material, e.g. glass, is fused or cast onto a substrate made of a machinable and conductive material, e.g. silicon. Subsequently, a recess is produced in an electrically conductive component and the two components are hermetically joined in such a way that a chamber is produced between the two.

A silicon/glass/silicon pressure sensor construction, which uses capacitive changes to measure pressure changes, is also described in German Patent No. DE 689 13 177.

The above-mentioned capacitive pressure sensors, however, have the disadvantage that for contacting the electrodes configured as diaphragms processes are required which penetrate very deeply into the material of the substrate. This does not allow for simple implantations. In addition, wires near the surface leading to the evaluation electronics are required, which, however, are susceptible to parasitic capacitances, especially if the medium to be measured comes into contact with the side on which the lead wires are located. Since with the miniaturization of a capacitive sensor the capacitances to be measured become very small, much development expense must be spent on electromagnetic compatibility (EMC).

Moreover, conventional sensors and circuits made of silicon only reach maximum operating temperatures of below approx. 150° C. This is due to the band gap of silicon of 1.1 eV. At higher temperatures, the material increasingly loses its semiconductive properties. With the disappearance of the p-n junctions, diodes and transistors lose their function and the insulation of implanted resistors with respect to the substrate is suspended. Hence, pressure sensors have already been developed, which allow for operating temperatures of up to 200° C. through the use of the SOI (silicon on insulator) material system containing the layer sequence of a thin silicon surface layer and a thin electrically insulating silicon oxide on a thick silicon substrate. Such a sensor on the basis of the 3C—SiC—SOI material system is made up of an evacuated cavity which is closed on the upper side by a thin diaphragm. To this end, first a ring diaphragm is patterned in a plasma process from the lower side of the SOI wafer. The patterned SOI substrate is joined in a hermetically sealed manner to a second wafer using fusion bonding in vacuum such that the cavity has a remaining pressure of approx. 50 mbar. Subsequently, the SIC layer is grown on the upper side of the wafer bond, the piezoresistors are patterned and interconnected via TiWN/Au circuit traces (cf. E. Thielicke and S. Zappe; Technische Universität [Technical University] Berlin, Fachbereich [Department] 12—Elektrotechnik [Electrical Engineering], Institut für Mess—und Automatisierungstechnik [Institute for Measurement and Automation Engineering], Jahresbericht [Annual Report] 2000, Bericht [Report] 193, p. 44 ff., December 2000).

SUMMARY OF THE INVENTION

The pressure sensor according to the present invention has the advantage that it allows temperature ranges to be entered, which have so far been inaccessible to silicon pressure sensors.

Furthermore, it is advantageous that the complete manufacture from silicon guarantees a minimum of temperature strain.

Another advantage is the fact that the sensor has an improved EMC compatibility and a lower susceptibility to parasitic capacitances.

DETAILED DESCRIPTION

Figure 3:
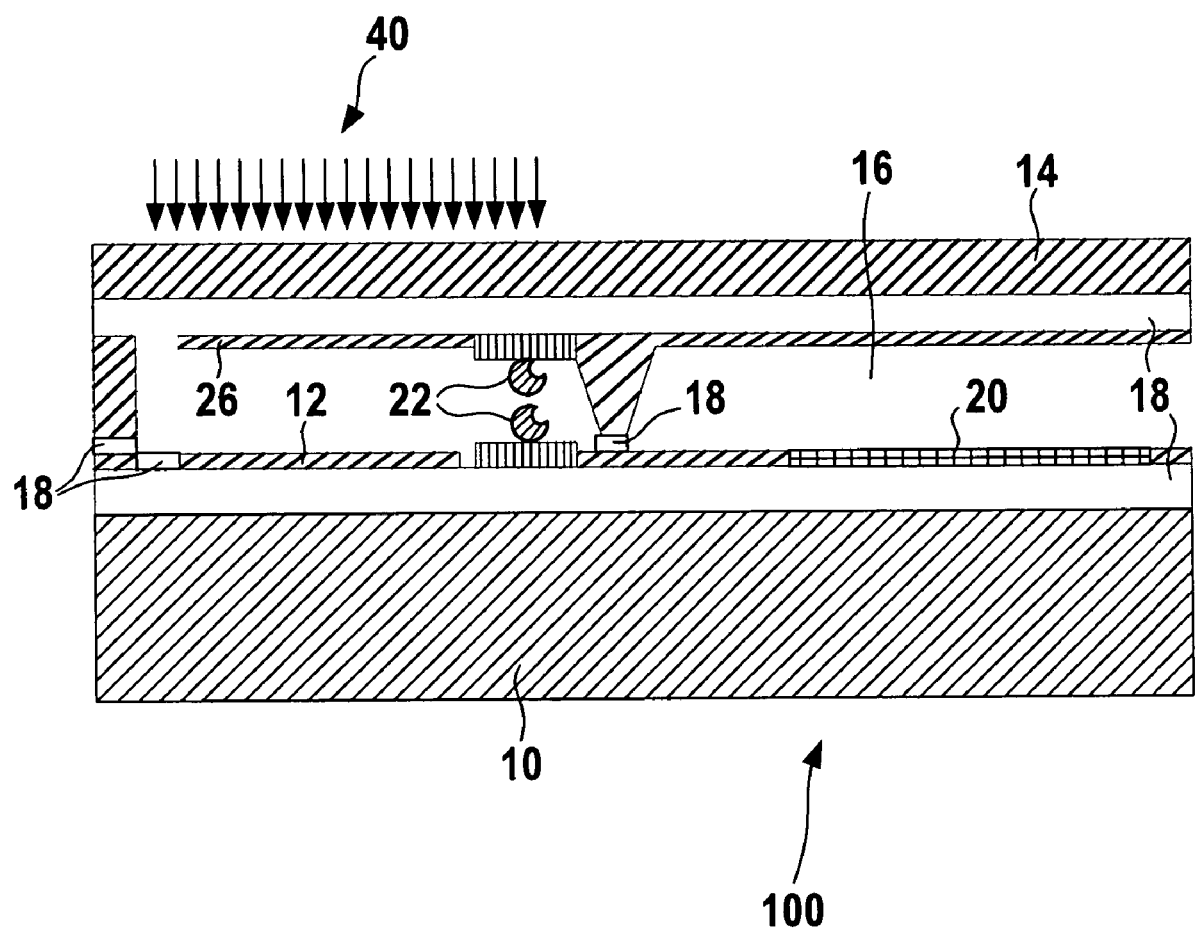

The core of the present invention is the manufacture of a capacitive pressure sensor 100, shown in FIG. 3, from two wafers bonded together using SOI technology, which is suitable for extreme temperature requirements and additionally allows for the integration of electronics suitable for high temperatures.

Figure 1:
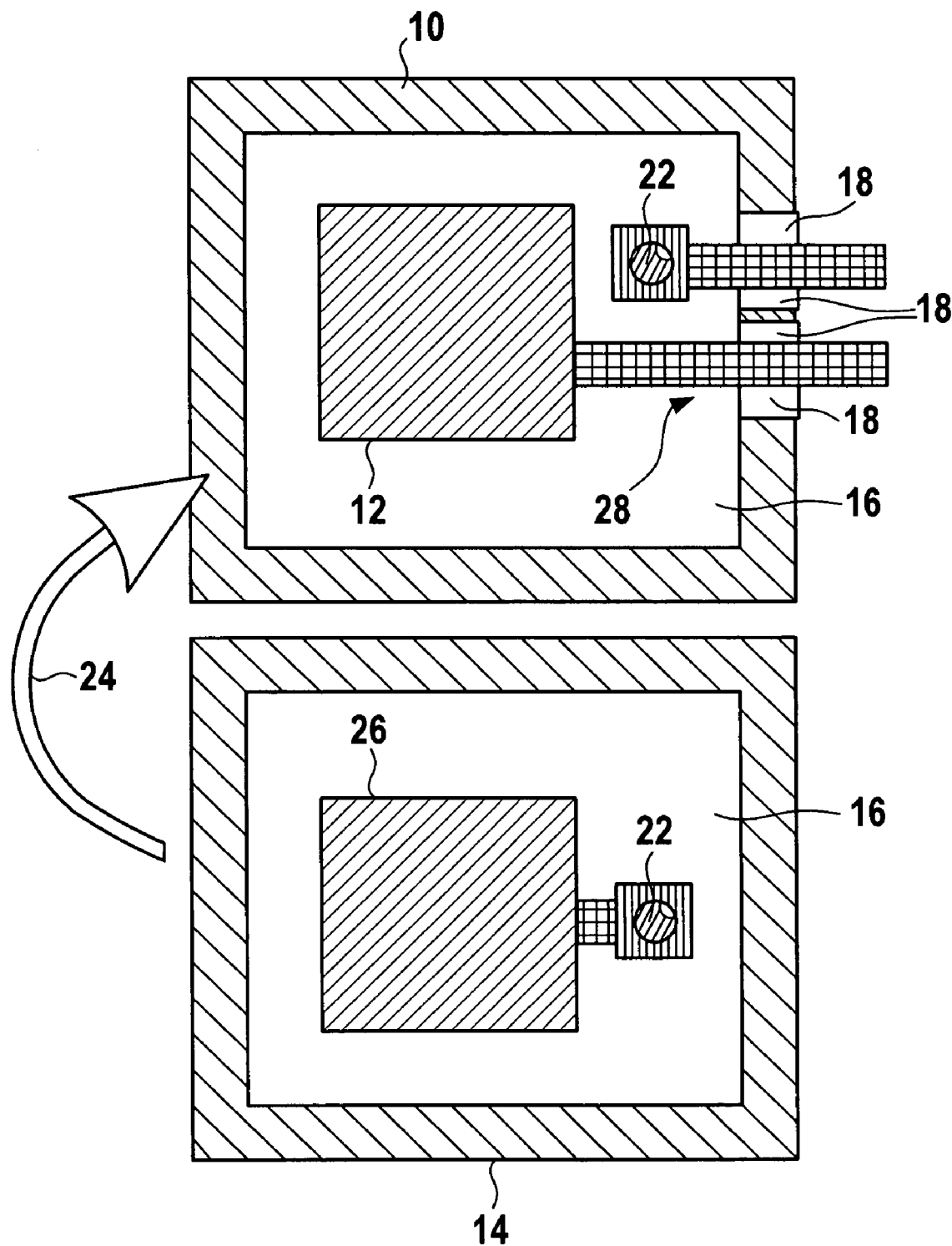
FIGS. 1, 2A–2C, 3 and 4 illustrate the sensor and method according to the present invention.

As can be seen from FIG. 1, first two SOI wafers 10, 14 are processed separately of each other and are subsequently joined together using a flip-chip process (arrow 24 in FIG. 1). In the process, the first wafer (electronics wafer 10, lower electrode 12), which supports the later evaluation circuits 20, is patterned by a conventional microelectronics process, supplemented by the trench etching of the capacitive electrode.

The steps for patterning evaluation circuits 20 follow currently existing technologies. This applies to the patterning of the amplifier circuit and passive integrated elements. In addition there is the process step for the lateral insulation of the electrode on the electronics wafer. For this purpose, in places that are not to be etched, the surface is covered by a photo-lithographic mask and the wafer is then prepared in an anisotropic gas etching process ("trench etching"). Subsequently, counter electrode 26 and its lead wire together with the regions supporting the electronics and those that later form the hermetic bonding surface are raised. Surrounded by the $SiO_2$ base material of the SOI wafer, electrode 12 together with its lead wire will then be insulated. Consequently, lower electrode 12 is merely led out to evaluation circuit 20 via a circuit trace. By doping, lower electrode 12 is constructed to conduct well, or it is covered by a metal coating to achieve good conductivity. To obtain a hermetically sealed cavity 16 according to the flip-chip process, the prepared $SiO_2$ trench is filled again with $SiO_2$ 18 in a refill process. Subsequently, the remaining functional layers are passivated. This achieves the planarity necessary to obtain a closed cavity when joining the two chips to each other. Finally, another contact metallization is required to achieve the flip-chip bond to the surface micromechanics wafer (see further below).

Second wafer 14 undergoes different surface micromechanics processes, among them the anisotropic etching of the cavity by KOH etching or trenching, diffusing in the circuit traces, patterning electrodes by anisotropic etching or trenching, a passivation, patterning contact holes and a metallization. The wiring arrangement allows for very low parasitic capacitances through the lead wires. The proximity of evaluation circuit 20 additionally guarantees a low interference.

Figure 2A:
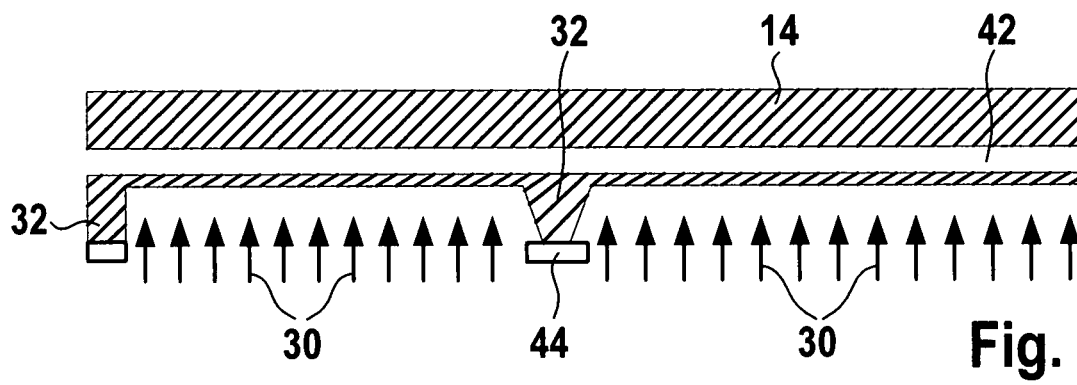
Figure 2B:
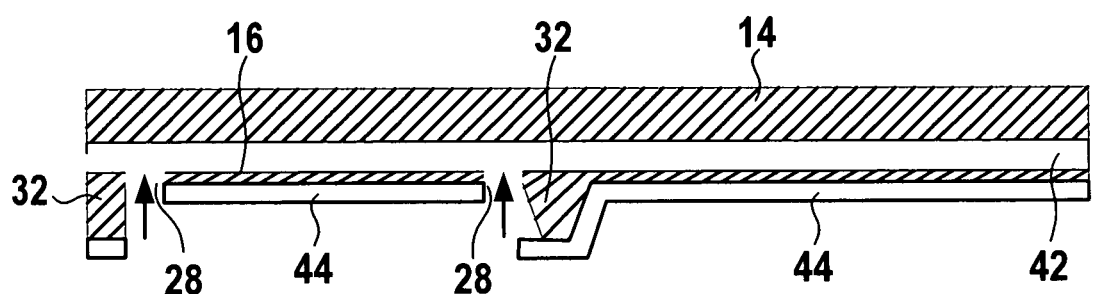
Figure 2C:
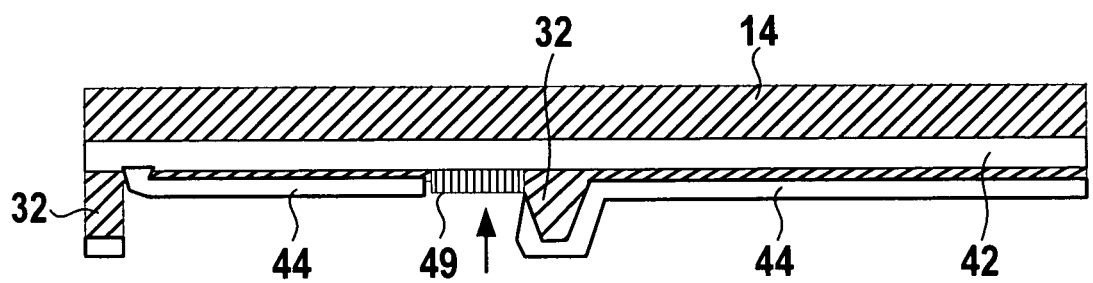

The surface micromechanics wafer is simpler to process since it does not require an integrated electronics, but rather is made up only of the electrode, lead wire, trench ring and contact metallization. This processing is shown in detail in FIGS. 2A through 2C.

In the first step, ring 28 is patterned around surface micromechanics electrode 26, which later forms the edge of cavity 16. That is to say, save for the cavity edge 32, which is protected by photoresist 44, all regions 30 are etched.

In the second etching step, surface micromechanics electrode 14 is insulated from cavity edge 32 in that an $SiO_1$ trench 28 is prepared. At the same time, the lead wire is insulated from the trench ring and the rest of the wafer such that it lies freely on $SiO_2$ layer 42 of SOI wafer 14. Regions that are not to be etched are covered by photoresist 44. Optionally, the electrode surface is doped to achieve better conductivity, or a metallization is applied on it. The layers are subsequently passivated by being coated with silicon oxide or silicon nitride.

The contact of the surface mechanics electrode to the electronics wafer is produced via flip-chip contacting. To this end, a contact metallization 48 of the lead wire to the surface mechanical electrode is required as a further process step. FIG. 3 shows the wafers bonded together.

Since evaluation circuit 20 is integrated in the immediate vicinity of electrodes 12, 26 (up to a distance of approx. 1000 µm), parasitic capacitances may be kept relatively small. At the same time, the surface miniaturization reduces the induced voltage from magnetic fields (this grows with the surface enclosed by the leads) and the reduced interstices reduces the induced voltage from gradients in the potential (electrical fields).

For joining the two wafers, a glass solder joint is preferred together with a soldering of the flip-chip bond. For this purpose, in a screen printing process, glass solder paste is applied on the places to be joined having a width of approx. 500 µm. Additionally, soldering globules 22 are also applied to the contact surfaces for the electrical contacting.

Then the two wafers are adjusted with respect to each other such that the bond surfaces are aligned with respect to each other. Subsequently, the wafer stack is heated to above 360° C. so as to initiate a press fit both in the glass solder regions as well as in the flip-chip contacting. Subsequently, the materials are definitely soldered together at even higher temperatures. The subsequent cooling process must be carried out in a suitably slow manner so as to reduce thermal-mechanical stresses possibly present in the bond.

The sensor is afterwards completed by a hermetically sealed joining of the two wafers, e.g. using seal glass (cf. FIG. 3). At the same time, the electrode of the OMM wafer is contacted by flip-chip bonding. This assemblage has at the same time the advantage that one of the wafers represents the cover for the other wafer such that the sensor makes do without a separate housing. Via the change of the capacity of the plate-type capacitor, the evaluation circuit then measures the pressure applied outside of the sensor (arrows 40 in FIG. 3).

The use of SOI wafers prevents the electrical breakdown of the doped regions, i.e. of the capacitor electrodes to the bulk silicon. The doped regions are usually separated by p-n junctions which become conductive at 150° C. The insulation via $SiO_2$, by contrast, withstands temperatures up to approx. 400° C. This thus makes the design suitable for temperatures above 150° C. With the aid of sufficiently thick insulator layers beneath the electrodes, i.e. layers having sufficient thickness to undershoot the breakdown field strength, a defined parasitic capacitance with respect to the surroundings of the cavity may be achieved. This ensures a uniform error effect on the sensor signal, which may be adjusted. With sufficient conductivity, the support wafer thus shields the electrodes against external interference effects from the fluid to be measured. The conductivity of the support wafer may be set by sufficiently high doping or a metallic coating. Due to the insulating $SiO_2$ layer toward the electrodes, the level of doping may be selected freely.

This is a decisive advantage compared to the design of conventional wafers having doped electrodes, in which the electrodes are patterned by p-n regions, which thus have a (voltage-dependent) capacitance corresponding to the p-n junction. These p-n regions have an extension that depends on their reverse voltage at which they are biased. Thus their capacitance changes with this reverse voltage.

Figure 4:
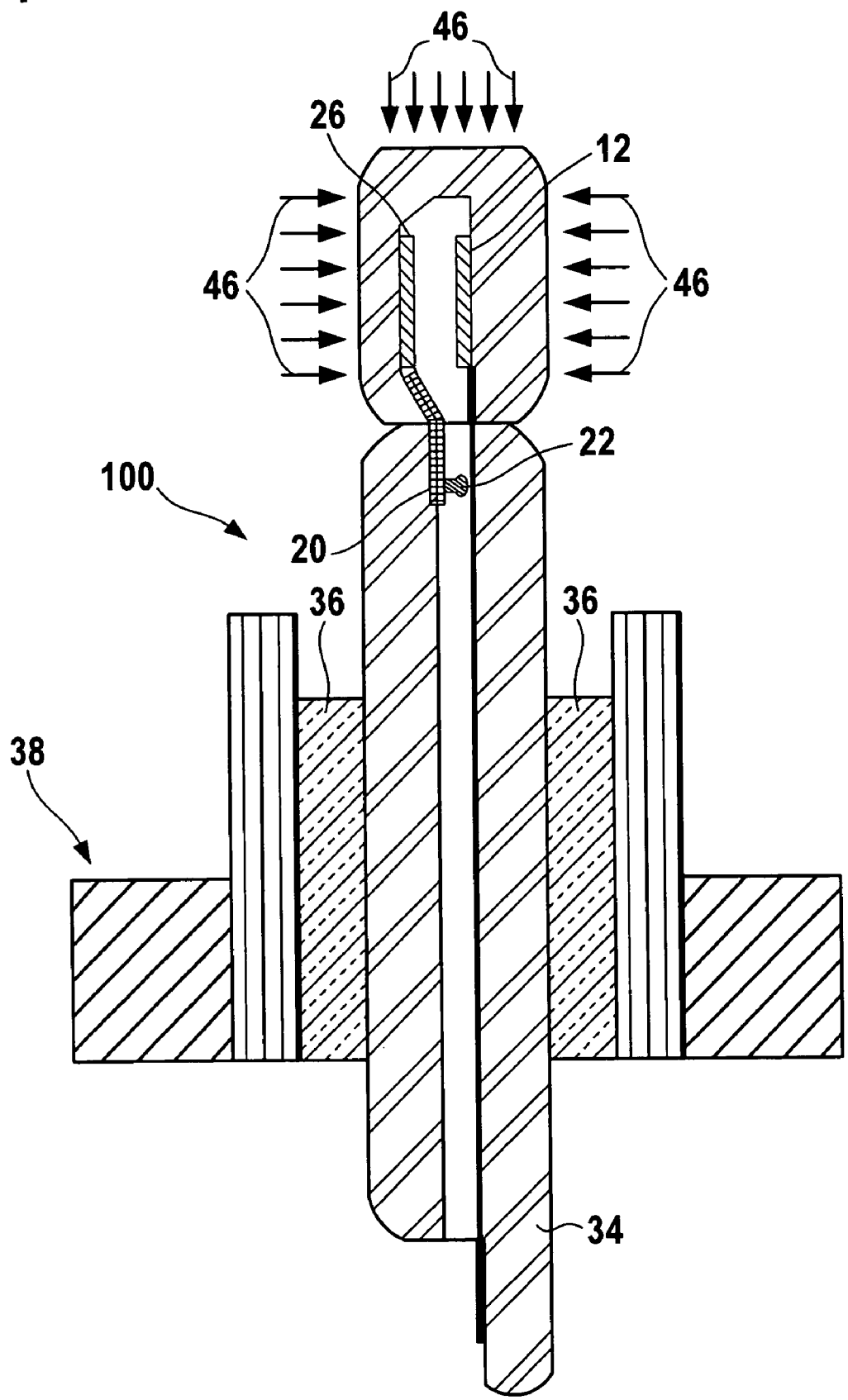

Following the manufacture, the sensor, as shown in FIG. 4, may be glazed into a metal lead-through 34 using seal glass 36 and welded into a housing 38. In this manner, a needle-shaped assemblage of the sensor may be achieved which allows for the sensor to be screwed into a container in a simple manner or to weld it to the container so as to use it to detect the pressure (cf. arrows 46 in FIG. 4). This achieves the separation between measuring container and surroundings in a simple manner. The lead-through of the electric sensor output into the outer region is given at the same time.

The use of SOI wafers as a base material not only allows for the capacitive surfaces to be designed for high temperatures, but at the same time also allows for the implementation of high-temperature resistant electronics. With the possibility of implementing blocking regions even beyond 150° C. it also becomes possible to operate integrated electronics stably above this temperature.

What is claimed is:

1. A capacitive pressure sensor comprising:
evaluation circuits for measuring an applied pressure;
a capacitive electrode;
a counter electrode; and
first and second silicon on insulator (SOI) wafers lying opposite of each other and being joined to each other in a vacuum-tight manner, a recess being formed between the first and second wafers, the first wafer supporting exclusively the evaluation circuits and the capacitive electrode, the second wafer having the recess formed by surface micromechanics processes, in which the counter electrode to the capacitive electrode of the first wafer is situated, the second wafer forming a cover for the first wafer.

2. The capacitive pressure sensor according to claim 1, wherein the sensor has the form of a needle.

3. The capacitive pressure sensor according to claim 1, wherein an electrical contact between two wafer levels is manufactured using flip-chip technology.

4. The capacitive pressure sensor according to claim 1, wherein the sensor is glazed into a metal lead-through.

5. The capacitive pressure sensor according to claim 4, wherein the sensor is introducible into a housing.

6. The capacitive pressure sensor according to claim 1, further comprising electronics operable above a temperature of 150° C.

* * * * *